S. BROADBENT.
TEETH FOR COAL-BREAKERS.
No. 192,733. Patented July 3, 1877.
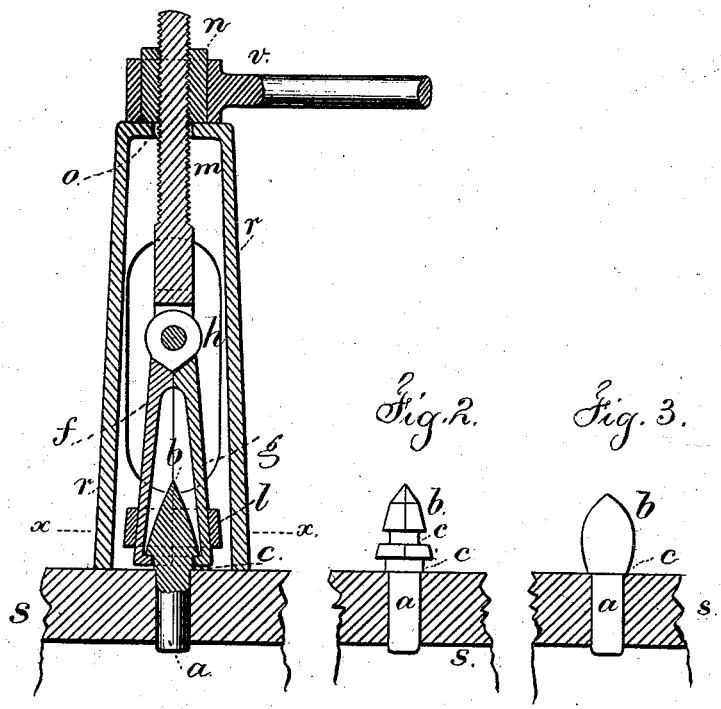
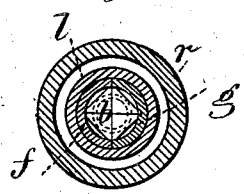
Witnesses
Chas. F. Smith
Harold Serrell
Inventor
Sidney Broadbent.
per Lemuel W. Serrell.
atty

UNITED STATES PATENT OFFICE.

SIDNEY BROADBENT, OF SCRANTON, PENNSYLVANIA.

IMPROVEMENT IN TEETH FOR COAL-BREAKERS.

Specification forming part of Letters Patent No. 192,733, dated July 3, 1877; application filed April 16, 1877.

*To all whom it may concern:*

Be it known that I, SIDNEY BROADBENT, of Scranton, in the county of Luzerne and State of Pennsylvania, have invented an Improvement in Rolls for Coal Crackers or Breakers, of which the following is a specification:

In the rollers that are used in coal-breakers the teeth are usually separate from the cylinder and introduced into holes or into rings. When the teeth become blunt and require to be sharpened, or when a tooth is broken, the cylinder usually has to be taken out of the breaker, and the teeth sharpened at the machine-shop. This is expensive and causes considerable delay. The teeth have also been placed into parallel holes in the cylinder, and when broken or worn they have been driven through into the cylinder; but in so doing the hole is enlarged, and the regular-sized tooth will be loose when replaced in the cylinder.

My invention relates to teeth for the breaker-rollers, said teeth being formed with enlargements outside of contractions or necks, so that the teeth can be pulled out when worn or broken and replaced by others that are to be driven into the holes from which the teeth are drawn. I also make use of an instrument constructed with especial reference to drawing said teeth out of the cylinder.

In the drawing, Figure 1 is a vertical section of the extracting-instrument and of the tooth to which it is applied. Figs. 2 and 3 show modifications in the form of the tooth, and Fig. 4 is a sectional plan at the line $x\ x$ of the extracting device.

The tooth is formed of a parallel body, $a$, and tapering point $b$, with a contraction or neck, $c$, sufficient for the extracting-instrument to grasp the tooth. This neck $c$ may be formed below a single square shoulder, as in Fig. 1, or a double shoulder, as in Fig. 2; or it may be a gradual curve to the base, as seen in Fig. 3. In either instance the extracting-instrument is shaped to fit the shoulder of the teeth, and grasp into the neck with a firm hold sufficient for holding the tooth while being extracted.

The teeth are placed at the required distances apart, as now usual.

The extracting device is made of the jaws $f\ g$, hinged together at $h$, and of an internal shape to fit the teeth, and externally these jaws taper and receive the sliding ring $l$, that is driven down around them after the jaws are placed upon the tooth. This ring holds the jaws firmly upon the tooth, so that the tooth can be extracted by suitable power acting upon the jaws.

To the joint $h$ the screw $m$ is connected, and it receives the nut $n$ above the closed end $o$ of the tube $r$. The tube $r$ or frame serves as a resistance for the nut $n$ as the latter is revolved by a suitable wrench, $v$, to extract the tooth by drawing the instrument and tooth bodily away from the cylinder. This tube or frame $r$ intervenes between the surface of the cylinder $s$ and the nut $n$.

It will be understood that the attendant examines the cylinders and extracts such teeth as may be worn out or broken, and replaces them by others that are simply driven into place by a "set" that fits upon the point.

I claim as my invention—

The coal-breaking cylinder made with teeth that are each provided with a cylindrical shank, and a neck between the portion of the tooth resting upon the cylinder and the largest part of the tooth, to allow the tooth to be grasped and withdrawn, substantially as specified.

Signed by me this 11th day of April, A. D. 1877.

SIDNEY BROADBENT

Witnesses:
TOWNSEND POORE,
JAMES COWAN.